(12) United States Patent
Ephraim et al.

(10) Patent No.: US 8,638,794 B1
(45) Date of Patent: Jan. 28, 2014

(54) METHOD AND SYSTEM FOR ROUTING TRAFFIC ACROSS MULTIPLE INTERFACES VIA VPN TRAFFIC SELECTORS AND LOCAL POLICIES

(75) Inventors: Robert Martin Ephraim, Bridgewater, NJ (US); Rohit Satish Kalbag, Bridgewater, NJ (US); Ben-Ren Chen, Northboro, MA (US)

(73) Assignee: Cellco Partnership, Basking Ridge, NJ (US)

( * ) Notice: Subject to any disclaimer, the term of this patent is extended or adjusted under 35 U.S.C. 154(b) by 913 days.

(21) Appl. No.: 12/761,131

(22) Filed: Apr. 15, 2010

(51) Int. Cl.
*H04L 12/28* (2006.01)

(52) U.S. Cl.
USPC .......................................... 370/392; 370/254

(58) Field of Classification Search
None
See application file for complete search history.

(56) References Cited

U.S. PATENT DOCUMENTS

| | | | | |
|---|---|---|---|---|
| 2003/0145106 A1* | 7/2003 | Brown | | 709/238 |
| 2005/0002407 A1* | 1/2005 | Shaheen et al. | | 370/401 |
| 2005/0041590 A1* | 2/2005 | Olakangil et al. | | 370/238 |
| 2005/0105560 A1* | 5/2005 | Mann et al. | | 370/503 |
| 2006/0056412 A1* | 3/2006 | Page | | 370/392 |
| 2009/0031258 A1* | 1/2009 | Arrasvuori et al. | | 715/863 |
| 2009/0045951 A1* | 2/2009 | Rajan et al. | | 340/540 |
| 2010/0144360 A1* | 6/2010 | Okuda | | 455/450 |
| 2010/0177730 A1* | 7/2010 | Okuda | | 370/329 |
| 2010/0260044 A1* | 10/2010 | Gormley | | 370/230 |

\* cited by examiner

*Primary Examiner* — Phirin Sam

(57) ABSTRACT

Method and system for routing traffic across multiple network interfaces with use of VPN traffic selector as part of decision making, for example, in the context of a mobile communication network. A packet data unit (PDU) is generated in association with an application that can be selectively activated on a mobile device and carries a destination Internet protocol (IP) address representing a server that supports the application. A broker associated with the mobile device retrieves information relating to traffic selectors and determines whether the PDU is associated with an operator application or a non-operator application based on the destination IP address and the information relating to traffic selectors. The broker routes the PDU to one of the multiple network interfaces based on whether the PDU is from an operator application traffic and local policies. When the PDU is associated with an operator application and the mobile device is not connected to its operator network, the PDU is routed via a virtual private network (VPN) selector.

24 Claims, 8 Drawing Sheets

METHOD AND SYSTEM FOR ROUTING TRAFFIC ACROSS MULTIPLE INTERFACES VIA VPN TRAFFIC SELECTORS AND LOCAL POLICIES

BACKGROUND

1. Technical Field

The present teaching relates to methods, systems, and programming for automatically routing traffic of different applications to appropriate network interfaces.

2. Discussion of Technical Background

With the advancement of telecommunication technologies, accessing information and making a connection with a remote party at anytime and anywhere have becoming realities. Network connections have become more and more ubiquitous. Early mobile devices used to have only one air interface for data communication. For example, a mobile device could interact with either Code Division Multiple Access (CDMA) or Global System for Mobile communications (GSM) air interfaces, but not both. However, mobile devices available in today's market are often made to be able to interact with different access technologies that enable user data access through different alternative network interfaces. Examples of such alternative network interfaces include WiFi, Worldwide Interoperability for Microwave Access (WiMax), and Long Term Evolution (LTE). Although these alternative data technologies may not have the extensive coverage provided by the primary air-interface technology (i.e., CDMA or GSM), they are important to offer users to have ubiquitous data access anywhere.

FIG. 1 (Prior Art) shows a network configuration 100 in which mobile devices may interact with multiple network air interfaces to access different applications. Mobile device 105 may access either its operator's applications or other types of services, including services from the Internet 145 (e.g., hosted on general Internet application servers 150) or from other private sources such as from a nearby printer 165 or a peer mobile device 155 accessible via a non-operator network 135 (e.g., WiFi). The operator's network 120 comprises a plurality of base stations 110, . . . , 115, one or more operator application servers 125, and a VPN concentrator 140. When the mobile device 105 is to access an operator's application, the mobile device may connect, when it is available, to a nearby base station, e.g., 110, which routes data between the mobile device 105 and the operator's application server 125 to facilitate the service. In common situations, a mobile device serviced by a network operator can access applications provided by its service provider by connecting to the operator's network. For instance, a customer of Verizon Wireless can access, on a mobile device, certain applications offered by Verizon Wireless by connecting to the Verizon Wireless network. To allow a mobile device user to access its service provider's applications, the service provider usually relies on authentication and access policies. With that mode of operation, the service provider assumes that the mobile device is accessing network resources from the mobile operator's Radio Access Network.

Newer mobile devices are designed to be able to support Internet connectivity from alternate radio access networks (e.g. Wi-Fi) that do not belong to the mobile operator. With those devices, when the operator's network is not available, the customer or the user of a mobile device serviced by the operator can still access the operator's application via a non-operator's network or alternative air-interfaces. For example, when mobile device 105 is in an area where the operator's wireless network 120 is not available, the mobile device 105 may connect to the non-operator network 135 (e.g., WiFi) in order to access its operator's applications. In this mode of operation, mobile device 105 needs to recognize the situation and act accordingly. This includes directing data traffic to the appropriate interfaces and taking actions to carry out appropriate connectivity procedures to make the mobile operators' application work on alternate interfaces.

In order to enable a mobile device to access its operator's services via alternate air interface technologies and/or general Internet access, virtual private network (VPN) tunneling to the operator network, e.g., the VPN concentrator 140, has been used. While this provides a solution to network access to the operator's services, problems exist. For example, when routing data traffic, it is not clear when to use which of the available alternate air-interface technologies. In addition, there is no mechanism to know when to setup the VPN and how to route data packets over multiple interfaces that result. Therefore, a more effective solution to the problem mentioned is needed.

SUMMARY

The teachings disclosed herein relate to methods and systems for routing traffic across multiple network interfaces via VPN traffic selectors and local policies by a mobile device.

In one example, a packet data unit (PDU) is obtained for routing, where the PDU is generated in association with an application that can be selectively activated on a mobile device and carries a destination Internet protocol (IP) address representing a server supporting the application. A broker, associated with the mobile device, then identifies the destination IP address from the PDU. Based on the identified destination IP address, the broker retrieves information related to one or more traffic selectors and determines whether the PDU is associated with an operator application or a non-operator application based on both the destination IP address and the information related to the traffic selectors. The PDU is then routed, by the broker, to one of the multiple network interfaces based on the determination as to whether the PDU is associated with an operator or non-operator application. If the PDU is associated with an operator application and the mobile device can not be connected to its operator network, the PDU is routed via a virtual private network (VPN).

As a different example, a mobile device capable of supporting routing traffic across multiple network interfaces comprises at least one transceiver configured for providing two-way communication of information in a plurality of modes via different channels, a microprocessor configured to be a programmable controller for controlling operations of the mobile device, and a storage configured to store information to be accessed and used by the microprocessor to facilitate routing traffic across multiple network interfaces via VPN and local policies and operations related thereto. For instance, the storage stores information related to one or more traffic selectors based on which a routing decision is made. Such a mobile device also includes a broker that is configured to receive a packet data unit (PDU), generated in association with an application that can be selectively activated on the mobile device and having a destination Internet protocol (IP) address representing the application, and route the PDU across multiple network interfaces. In routing a PDU, the broker routes the PDU to one of the multiple network interfaces based on whether the PDU is associated with an operator application or a non-operator application. When a PDU is associated with an operator application but the mobile device can not be connected to an operator network, the broker routes the PDU via a VPN.

As another example, a machine readable medium has instructions recorded thereon, which, when read by the machine, causes the machine to perform functions including obtaining a packet data unit (PDU), generated in association with an application that can be selectively activated on the mobile device and carrying a destination Internet protocol (IP) address representing a server supporting the application. Execution of the instructions also causes the machine to identify, by a broker associated with the mobile device, the destination IP address from the PDU and retrieve information relating to one or more traffic selectors. Such identified destination IP address and the retrieved information relating to the traffic selectors are then used to determine, by the broker, as to whether the PDU is associated with an operator application or a non-operator application based on the destination IP address and the information relating to the one or more traffic selectors. Execution of the instructions further causes the machine to route the PDU to one of multiple network interfaces based on whether it is associated with an operator application or a non-operator application and when a PDU is associated with an operator application and the mobile device can not be connected to its operator network, the PDU is routed via VPN.

Other concepts relate to unique software for implementing the routing traffic over multiple alternative network interfaces. A software product, in accord with this concept, includes at least one machine-readable medium and information carried by the medium. The information carried by the medium may be executable program code data regarding parameters in association with local policies, such as the preferences in selecting a specific network when multiple networks are accessible, priority of preferences, etc.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to a framework designed and implemented in a mobile device for routing traffic across multiple network interfaces via a VPN traffic selector and local policies. More specifically, the present teaching relates to methods, systems, and program products of a policy framework in a mobile device that enables the mobile device to make routing decisions with respect to multiple network interfaces based on the nature of the traffic, network connectivity, and local policies with regard to traffic selection. A broker is disclosed that is deployed to facilitate the routing decision making.

The Traffic Selectors (TS) have been used to differentiate traffic that should go inside or outside of the VPN. The present teaching extends the use of TS to routing traffic across network interfaces. TSs are generally sent, dynamically, by the network to mobile devices and can be used as an input to policy decisions. The IP address ranges in the TS are represented as ranges of IP addresses. Certain IP address range(s) can be associated with particular operator's applications. Traffic resulting from an application that bears a destination IP address matching the TS of a particular operator's application can be routed over a network operated by the operator. For instance, PDU's associated with applications offered by Verizon Wireless (operator) may have destination IP addresses falling within one or more ranges of IP addresses identified in the TS and Verizon Wireless' network may be a CDMA network. In this case, traffic not associated with Verizon Wireless applications (i.e. general Internet traffic) may be routed over a Wi-Fi network when it is accessible, thus accomplishing data offload to Wi-Fi from a CDMA network.

Figure 1:
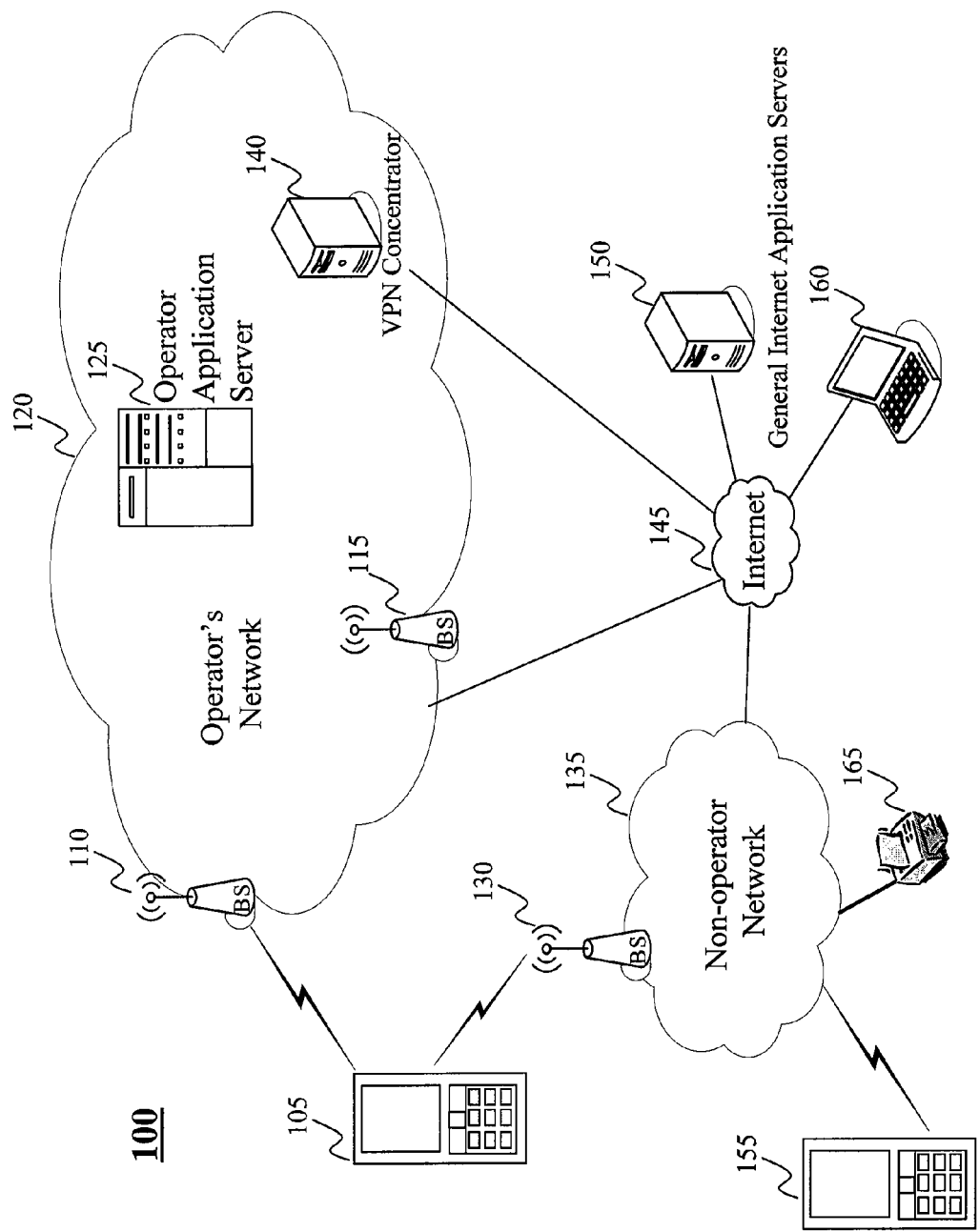
FIG. 1 (Prior Art) shows a network configuration in which mobile devices interact with multiple network air interfaces to access different applications.

When a PDU has a destination IP address indicating that the PDU is from an operator's application (e.g., the destination IP address falls within ranges of IP addresses representing traffic selectors) but the operator's network is not available, in this case, the PDU is routed via a non-operator network (e.g., the WiFi network) using a virtual private network so that the PDU can be forwarded to an operator application server that supports the operator's application. The operator application server is located in the operator network and can be reached either via other router in the operator's network or via a VPN using the VPN concentrator (see FIG. 1).

Traffic resulting from an application that bears a destination IP address that does not match the TS of a particular operator's application can be routed through either the operator's network or a non-operator network, depending on accessibility. There are different possibilities when the destination IP address does not match the TS for an operator's applications. In some situations, the destination IP address corresponds to a public IP address. For example, when a user of a Verizon Wireless mobile device desires to access a general Internet application at a particular locale, the traffic associated with the Internet application corresponds to a destination IP address that does not match any of the IP addresses in the TS for Verizon Wireless applications. In this situation, the traffic may be routed to a WiFi network (non-operator network) if it is accessible at that locale or a CDMA network when WiFi is not accessible at that locale. Another possibility is that the destination IP address corresponds to a private IP address that does not match the TS for the operator's applications. In this situation, the traffic associated with the private IP address is routed to a non-operator network (e.g., WiFi).

Figure 2:
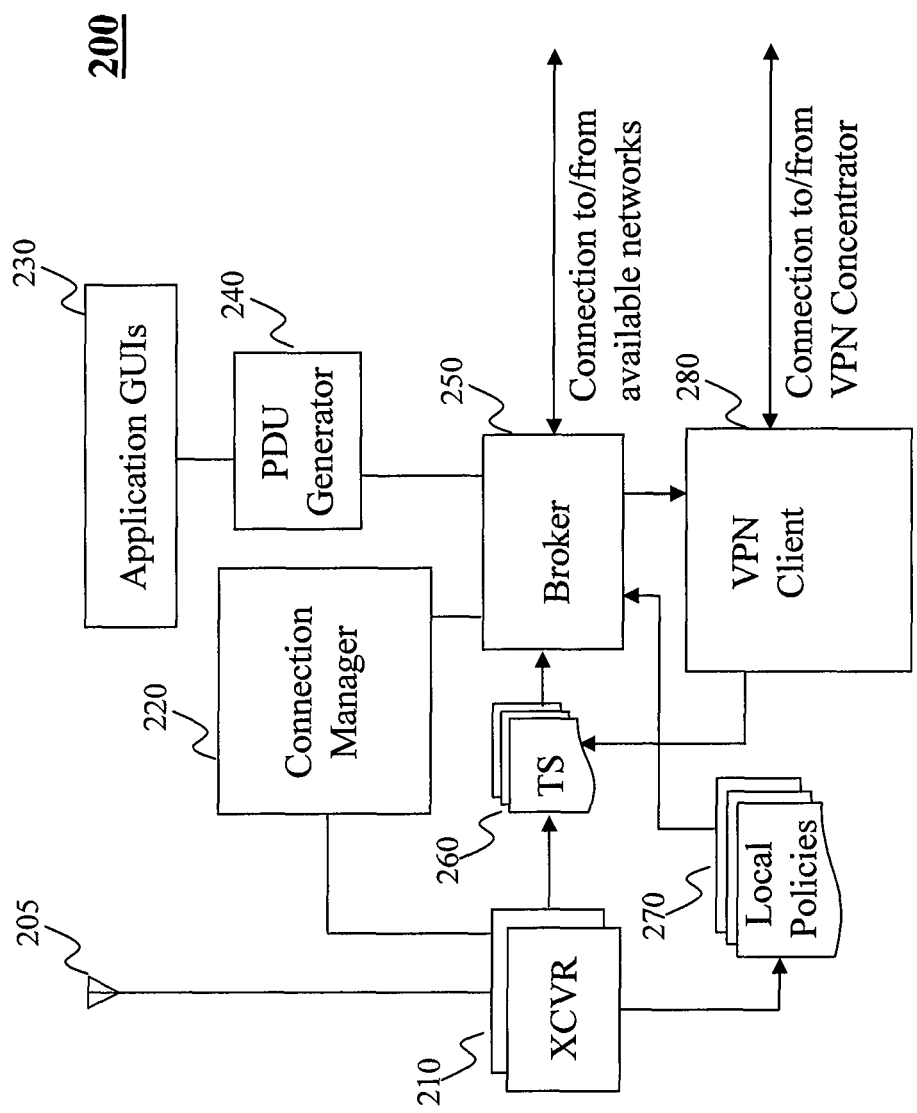
FIG. 2 depicts a configuration of some components within a mobile device that facilitates routing traffic across multiple network interfaces via a VPN traffic selector and local policies.

FIG. 2 depicts a configuration 200 of some components within a mobile device that facilitate traffic routing across multiple network interfaces via a VPN traffic selector and local policies, according to an embodiment of the present teaching. The exemplary system configuration 200 includes various application graphical user interfaces 230, through which a user of a mobile device can selectively activate different applications. The configuration 200 also includes a packet data unit (PDU) generator 240, which is responsible for generating packet units based on the data resulting from an activated application. Typically, each PDU has a destination IP address, signifying where the PDU is to be sent. Each PDU generated by the PDU generator 240 is forwarded to a broker 250, which is responsible for making a routing decision across different network interfaces.

Broker 250, upon receiving a PDU, routes the PDU to an appropriate network in accordance with the method as described herein. The broker 250 makes a routing decision based on TS information 260, network connectivity, and local policies 270 stored in a storage. In some embodiments, TS 260 correspond to ranges of destination IP addresses representing the IP addresses of servers that support corresponding applications that can be selectively activated on the mobile device. In some embodiments, ultimately, TS 260 corresponds to ranges of destination IP addresses representing IP addresses of operator application servers that can be used to route a PDU associated with an operator application to its corresponding application server via virtual private network traffic selection. Such ranges of IP addresses for different operator applications can be received by the mobile device from the network, e.g., from one or more VPN concentrators, via transceiver 210 and antenna 205, and stored in the mobile device. TS 250 may also be cached and regularly or dynamically updated from the network when it is needed. TS 250 may include ranges of IP addresses corresponding to applications supported by one or more operators, each of which may have an associated operator network. Specific TS information for each mobile device may be user dependent, device dependent, or operator dependent.

In some embodiments, local policies 270 correspond to operational parameters used by the broker 250 to make a routing decision. Local policies may specify, e.g., a certain priority in choosing a particular network to be used to route a packet. For instance, when the mobile device is in an area where multiple network interfaces are present, the local policies may dictate, given a known type of application associated with a PDU to be routed, a certain order of preference by which one network interface out of multiple ones is to be chosen to route the PDU. Local policies 270 may be initially set up in the mobile device and may be subsequently updated via, e.g., downloading from the network of updated policies or uploading from an external device. In addition, local policies may be user or device dependent, e.g., depending on the services subscribed. In some embodiments, a mobile device may allow a user to change local policies based on the user's particular needs. This flexibility combined with the ability to update Traffic Selectors during VPN setup based on what services that particular subscriber has subscribed to, provides the advantage of routing all traffic flows, including both those routed via the operator's network and those routed via alternate air interface technologies, to the operator's network so that the operator can enforce network policies such as content filtering.

Based on TS 260, e.g., as ranges of destination IP addresses, and local policies, the broker 250 is able to not only identify the nature of a traffic flow as to whether relating to, e.g., an operator's applications but also able to directing or routing the PDUs from this traffic flow to an appropriate network interface. In addition to the TS and local policies, a routing decision made by broker 250 may also depend on the availability status of different network interfaces, which the broker 250 can obtain from a connection manager 220. In making a routing decision, broker 250 is also configured to be able to control connectivity of a selected network interface and when appropriate, set up the VPN using the VPN Client 280 so that traffic can be routed via a VPN to an operator network (see FIG. 1).

Figure 3:
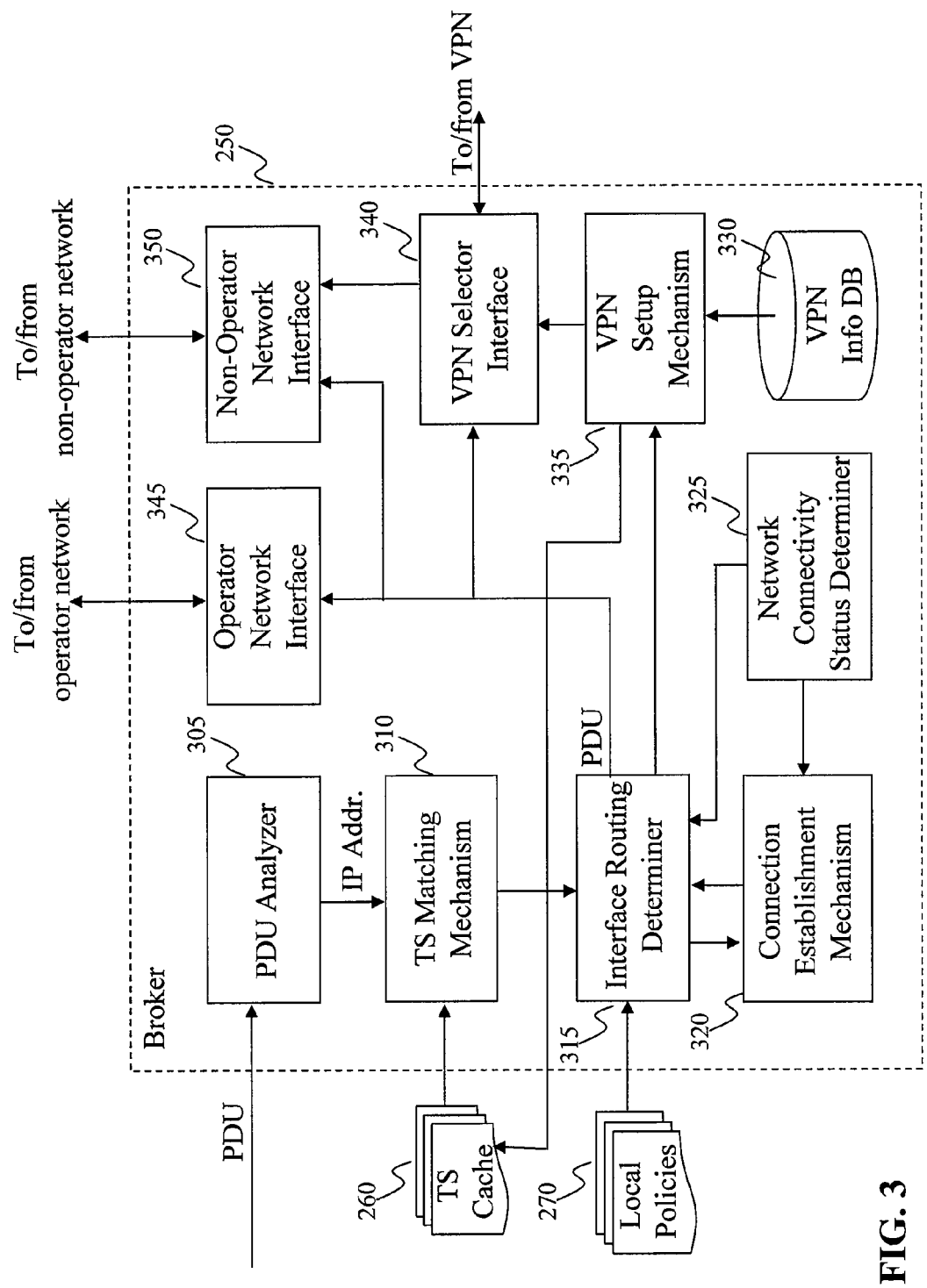
FIG. 3 depicts an exemplary system diagram of a broker responsible for routing traffic across multiple network interfaces.

As disclosed herein, the deployment of broker 250 in a mobile device allows the mobile device to examine the destination address of each data packet and carry out appropriate routing with respect to each data packet based on the present connectivity environment no matter where the mobile device is located. FIG. 3 depicts an exemplary system diagram of broker 250 and its interactions with other components of a mobile device, according to an embodiment of the present teaching. In this illustrated embodiment, broker 250 comprises a PDU analyzer 305, a TS matching mechanism 310, an interface routing determiner 315, a network connectivity status determiner 325, a connection establishment mechanism 320, a VPN setup mechanism 335, a VPN selector interface 340, an operator network interface 345, and a non-operator network interface 350.

In operation, when a PDU is forwarded from the PDU generator 240 to the broker 250 (see FIG. 2), the PDU analyzer 305 analyzes the PDU and extracts, e.g., a destination IP address contained in the PDU. Such extracted destination IP address is then sent to the TS matching mechanism 310 so that it can be matched against ranges of destination IP addresses associated with the Traffic Selector 260. The matching result is then sent to the interface routing determiner 315, where the interface routing determiner 315 is to make an interface routing decision based on the matching result, the local policies 270, as well as the connectivity status of different networks reported by the network connectivity status determiner 325. In some situations, to make a routing decision, the interface routing determiner 315 may also instruct the connection establishment mechanism 320 to make connection(s) or association(s) to certain network(s). For example, in some situations, an operator network connection is needed for an operator's application but the network connectivity status is that the operator's network is not connected but available. In this case, the interface routing determiner 315 may instruct the connection establishment mechanism 320 to connect the mobile device to the operator's network. If the connection is made successfully (the interface routing determiner 315 may obtain a status update from the network connectivity status determiner 325), the interface routing determiner 315 may then move forward to make a decision to route the traffic via the operator's network. If the connection fails, the interface routing determiner 315 may then make an alternative decision to route the traffic to the operator's application server via an alternative non-operator network, e.g., the WiFi network, via the VPN traffic selector interface 340. Details related to various routing decisions will be described below with reference to FIGS. 4-7.

Once a routing decision is made, the interface routing determiner 315 forwards the PDU to an appropriate component so that the routing decision can be carried out. For example, if the routing decision is to route the current PDU to the operator's network and the operator's network is currently connected, the interface routing determiner 315 forwards the PDU to the operator network interface 345, which subsequently sends the PDU to the operator's network. If the routing decision is to route the current PDU to a non-operator's network and the non-operator's network is currently connected or associated, the interface routing determiner 315 forwards the PDU to the non-operator network interface 350, which subsequently sends the PDU to the non-operator's network.

When a routing decision is to route a PDU to the operator's application server via a non-operator's network by utilizing the VPN selector, the VPN connection has to be made prior to routing the PDU. To ensure that the connection between the mobile device and VPN is made, in some embodiments, the TS cache 260 may be initially set to have IP address(es) that can be used to trigger the activation of VPN connection by the mobile device. For instance, the initial TS may be set to be any address (instead of IP addresses corresponding to operator applications), including general public IP address or private IP address, so that when a user operating the mobile device selects any application, the destination address of a PDU associated with this application will fall within the range of TS. This will trigger the broker 250 to check whether the VPN is current connected and if not, it will activate the VPN Setup Mechanism to make a connection with the VPN concentrator (see FIG. 1). Once the connection between the mobile device and the VPN concentrator is made, the actual TS information will be, e.g., sent from the VPN concentrator to the mobile device so that it can be stored as TS 260 for all future usage. Each time, when TS information is updated, the TS 260 is updated with the new TS information. In addition, when multiple operators are involved, TS 260 includes ranges of IP addresses for each operator.

There are certain situations in which a PDU is to be routed via a VPN connection. For example, when a PDU is associated with an operator application but the operator network connection can not be made (e.g., either not available or fail to connect even though it is available). In this case, the PDU may be routed to the corresponding operator application server, residing within the operator network, via VPN through a non-operator network. When this occurs, the interface routing determiner 315 forwards the PDU to the VPN selector interface 340, after the VPN is set up by the VPN setup mechanism 335. The VPN selector interface 340 interacts with the VPN traffic selector 280 to determine which specific VPN is to be used to route the PDU. This may be determined based on whether the destination IP address contained in the PDU is within TS 260 or any of the ranges of IP addresses representing applications from one or more operators.

Such information about a specific VPN traffic selector is then used by the VPN selector interface 340 to interact with the non-operator network interface 350, which subsequently communicates with a non-operator network to route the PDU to a selected non-operator network. Although most of the description herein refers to an operator or its corresponding operator applications or network, it is understood that the present teaching also applies to situations where more than one operator or enterprise network and, hence, more than one operator network or enterprise network, may be involved in traffic routing across multiple network interfaces.

Figure 4:
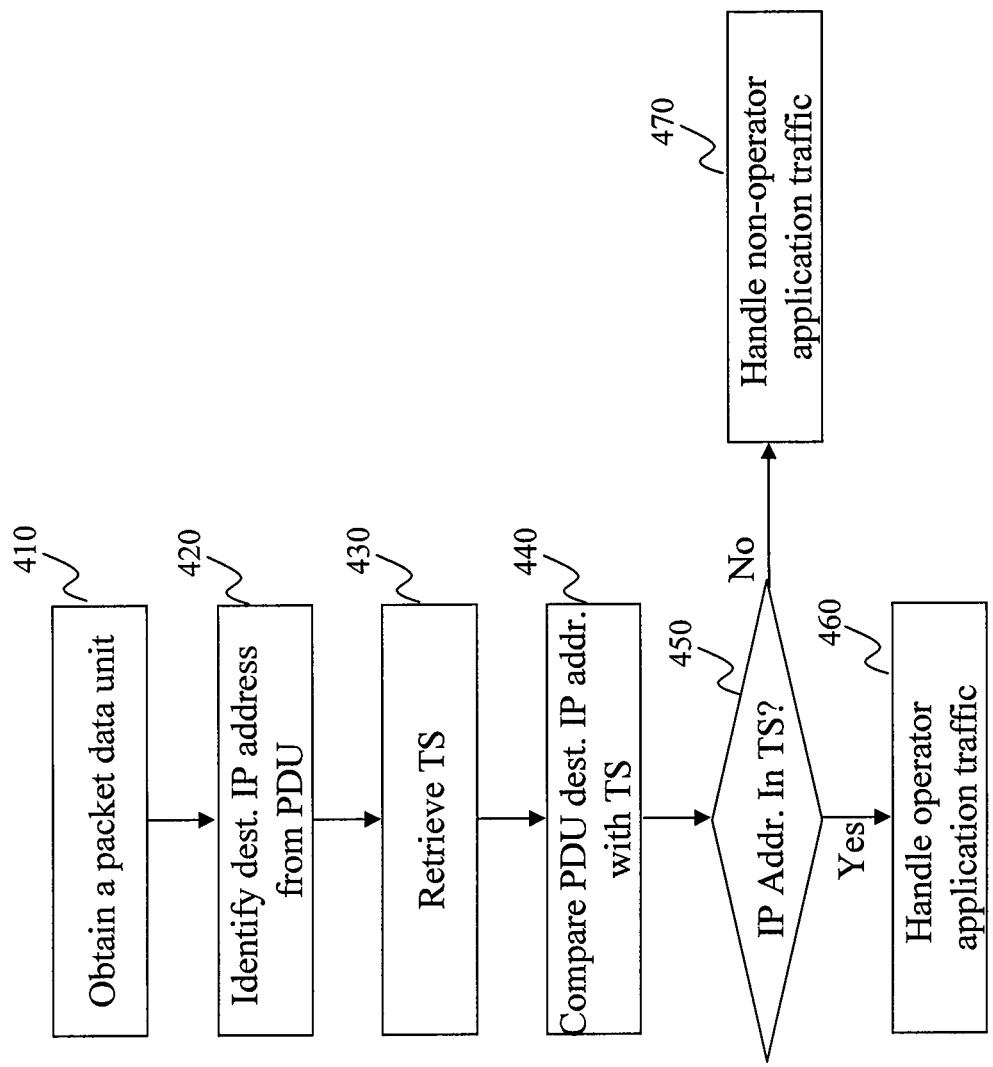
FIG. 4 is a flowchart of an exemplary process in which a data unit is routed to an appropriate network interface.

As discussed herein, a routing decision is made based on the destination IP address contained in the PDU, which indicates the nature of the application, the TS ranges of IP addresses, local policies and the connectivity status of the networks. FIG. 4 is a flowchart of an exemplary process in which a PDU is routed to an appropriate network interface by the broker, according to an embodiment of the present teaching. A PDU is first obtained, at 410, and the destination IP address is identified, at 420, from the PDU. To determine the nature of the application which yields the PDU, the broker retrieves, at 430, relevant TS information which may be previously stored. The destination IP address extracted from the PDU is compared, at 440, with the ranges of IP addressed retrieved from the TS storage and it is determined, at 450, whether the destination IP address falls within a range of IP addresses corresponding to an operator's application. If the destination IP address matches the range of IP addresses corresponding to an operator's application, the broker proceeds, to 460, to handle traffic of an operator's application. If the destination IP address does not match the range of IP addresses corresponding to an operator's application, the broker proceeds, to 470, to handle traffic of a non-operator's application.

Figure 5:
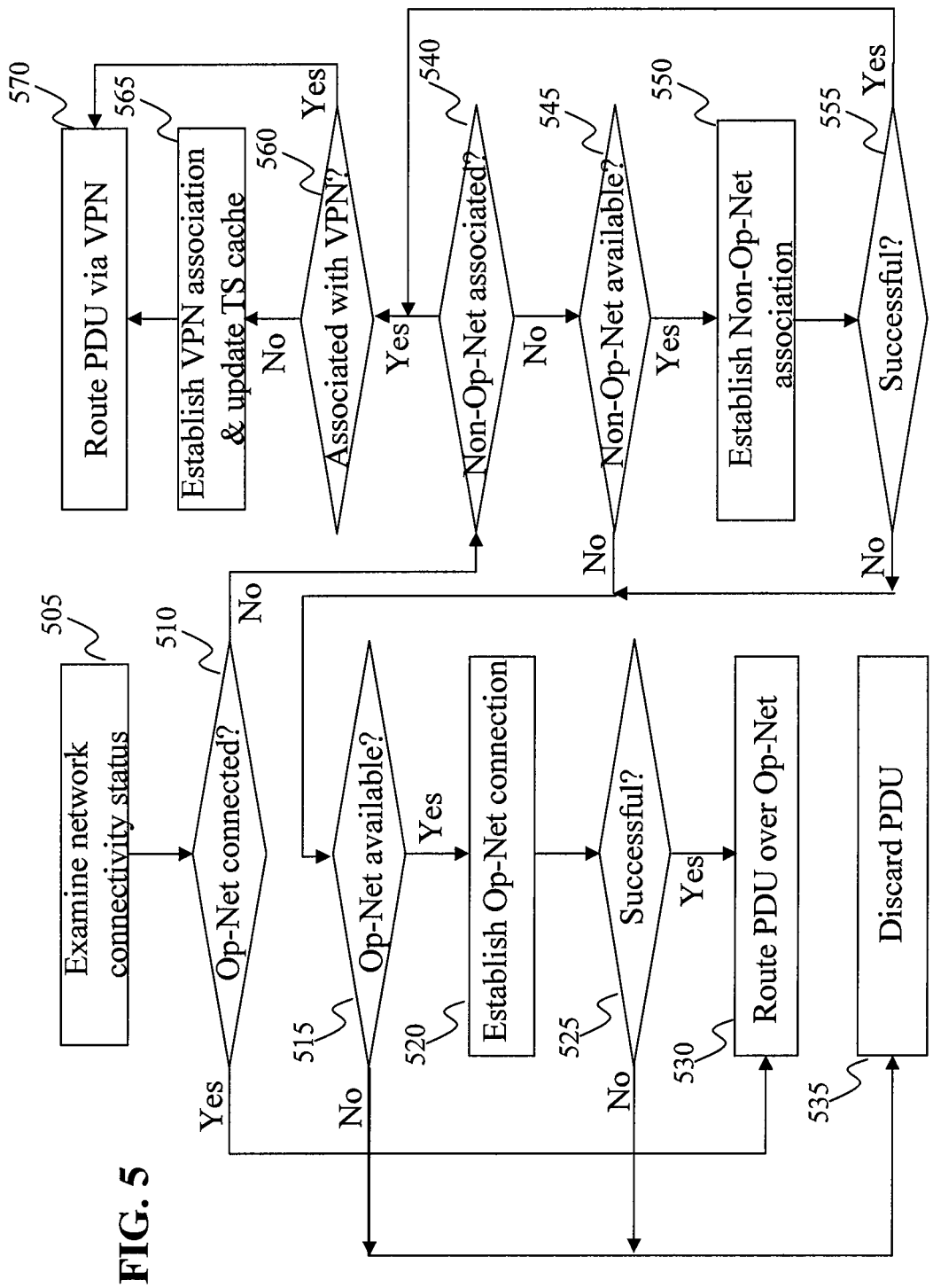
FIG. 5 is a flowchart of an exemplary process in which a data unit resulting from an operator application is routed appropriately.

FIG. 5 is a flowchart of an exemplary process in which a PDU resulting from an operator application is routed in accordance with an embodiment of the present teaching. To route a PDU resulting from an operator's application, the broker 250 first examines, at 505, the network connectivity status. If the operator network is currently connected with the mobile device, determined at 510, the broker 250 sends, at 530, the PDU to the operator network via the operator network interface 345 (see FIG. 3). If the operator network is currently not connected with the mobile device, the broker 250 checks, at 540, whether a non-operator network is currently associated with the mobile device (e.g., WiFi). If such an association with a non-operator network exists, the PDU needs to be sent to the operator network via the VPN 280. Before that, the broker 250 checks, at 560, whether the VPN is currently set up on the mobile device. If the VPN has been set up and the association with the non-operator network has been made, the broker sends, at 570, the PDU to the VPN concentrator via the non-operator network and the VPN concentrator can then direct the PDU to the operator application server 125. If the VPN has not been set up even though the non-operator network association has been made, the broker first sets up, at 565, the VPN association. As discussed herein, once a VPN connection is made with a VPN concentrator, traffic selection or TS information may be downloaded in to the mobile device. In this case, the storage for TS information is updated and the cache for TS may be renewed with newly downloaded TS information. Once the VPN is set up, the broker 250 then routes, at 570, the PDU to the operator application server via the non-operator network 135.

If the mobile device is currently not associated with a non-operator network, determined at 540, broker 250 further checks, at 545, whether a non-operator network is available. If a non-operator network is available, broker 250 will attempt to establish, at 550, an association between the mobile device and the available non-operator network. If the association with the non-operator network can be successfully established, determined at 555, the broker proceeds to check, at 560, whether the VPN has been set up on the mobile device. If VPN has not been set up, the broker acts to setup, at 565, the VPN association before it proceeds to send the PDU to the operator application server via the associated non-operator network.

When the mobile device is currently not connected to an operator network (determined at 510) and not associated with a non-operator network, either no non-operator network is available or even though available an attempt to make an association has failed (545 or 555), the broker proceeds to check, at 515, whether the operator network is available for connection. If the operator network is not available, the broker discards, at 535, the PDU because of lack of a network connection by which to route the PDU. If the operator network is available, the broker then tries to establish, at 520, the connection between the mobile device and the operator network 120. If the attempt is successful, determined at 525, the PDU is sent to the operation application server 125 via the operator network 120. Otherwise, the PDU is also discarded.

Although the flowchart in FIG. 5 describes the steps in a certain order, it is understood that what is shown is merely illustrative. A person skilled in the art would understand that a different order may also be applied and a different arrangement of steps would still fall within the scope of the present teaching. For example, when it is determined that the mobile device is currently not connected to the operator network (510), instead of checking directly for the availability of the non-operator network, the broker may alternatively attempt to first connect the mobile device with the operator network, as described in steps 515-530, and will proceed to resort to the non-operator network when the operator network is either not available (515) or the attempt to connect, even though available, has failed (525).

Figure 6:
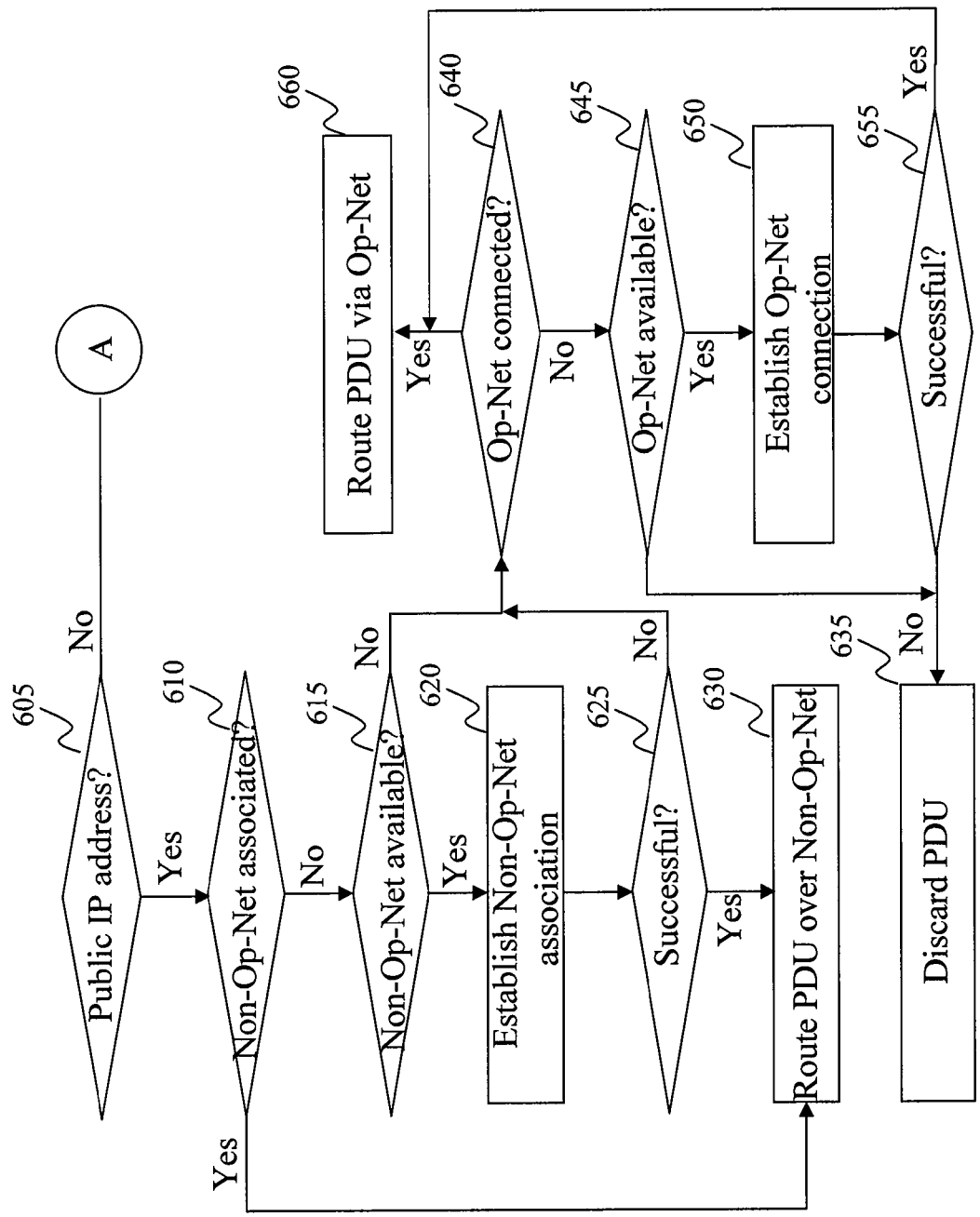
FIG. 6 is a flowchart of an exemplary process in which a data unit resulting from a non-operator application is routed appropriately.

FIG. 6 is a flowchart of an exemplary process in which a PDU resulting from a non-operator application is routed according to an embodiment of the present teaching. Since it is a PDU from a non-operator application, it is first checked, at 605, whether the destination IP address identified from the PDU is a public or private IP address. If it is a private IP address, it may indicate that the mobile device user is trying to reach a service accessible via a non-operator network. For instance, a mobile device user may try to reach a printer (165 in FIG. 1) located in the locale where the mobile device is currently operating. In addition, a mobile device user may try to reach a peer mobile device connected via a locally active non-operator network. In this case, it is likely that only non-operator network can be used to route the PDU. In this case, the processing proceeds to an exemplary flow described in FIG. 7.

On the other hand, if the destination IP address is a public IP address, it usually indicates that the mobile device user is accessing some publicly accessible services such as an Internet browser or a search engine. Generally, when the service requested is publicly accessible, either the operator network or a non-operator network may be used to route the PDU, whichever one is accessible at the time of the service request. Therefore, when the PDU is determined to have a public IP address at 605, the broker checks, at 610, whether the mobile device is currently associated with a non-operator network (e.g., WiFi). If the mobile device is already associated with a non-operator network, the PDU is routed, at 630, via the associated non-operator network. If the mobile device currently is not associated with a non-operator network, the broker checks, at 615, whether a non-operator network is available. If a non-operator network is available, the broker tries to establish, at 620, an association between the mobile device and the available non-operator network. If the association attempt is successful, determined at 625, the broker routes, at 630, the PDU to the associated non-operator network.

When either no non-operator network is available (determined at 615) or the attempt to establish an association with a non-operator network fails (determined at 625), the broker then tries to route the PDU via the operator network by first checking, at 640, whether the mobile device is currently connected to the operator network. If it is, the broker routes, at 660, the PDU via the operator network. If the mobile device is currently not connected to the operator network, the broker checks, at 645, whether the operator network is available. If the operator network is not available, the broker discards, at 635, the PDU because there is no viable way to route the PDU. If the operator network is available but the mobile device is not connected with it, the broker tries to establish, at 650, the connection between the mobile device and the operator network. When the attempt to connect the mobile device and the operator network is successful, determined at 655, the broker routes the PDU to the operator network at 660. Otherwise, the broker discards, at 635, the PDU due to lack of a viable network to route the PDU.

In the exemplary flow as described in FIG. 6, a non-operator network is treated as a first choice to route a PDU resulting from a non-operator application with a public IP address. It is understood that this order of priority in selecting an alternative network interface to route such a PDU is merely illustrative. Other orders of priority may also be applied and such variations are within the scope of the present teaching and can be controlled by local policies.

Figure 7:
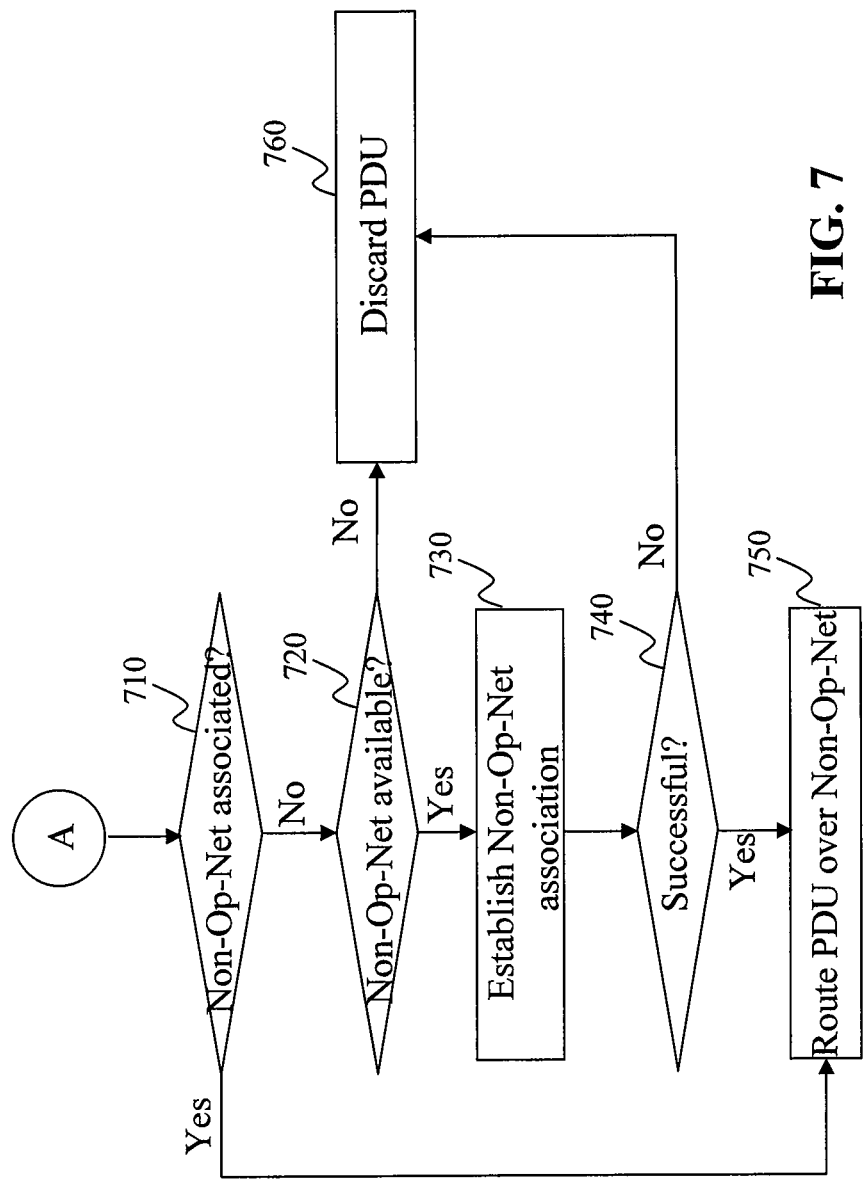
FIG. 7 is a flowchart of an exemplary process in which a data unit intended for a private IP address is routed appropriately.

When the PDU was the result of a non-operator application and has a private IP address, the broker will route the PDU via a non-operator network. FIG. 7 is a flowchart of an exemplary process in which the broker routes a PDU with a private IP address, according to an embodiment of the present teaching. As discussed herein, when a PDU was the result of a non-operator application with a private address, the broker will route the PDU via a non-operator network. The broker first checks, at 710, whether the mobile device is currently associated with a non-operator network. If it is, the broker routes, at 750, the PDU via the associated non-operator network. If the mobile device is currently not associated with a non-operator network, the broker checks, at 720, whether a non-operator network is currently available. If no non-operator network is currently available, the broker discards, at 760, the PDU. If there is a non-operator network available, the broker then attempts to established, at 730, an association between the mobile device and the available non-operator network. If the attempt to associate is successful, determined at 740, the broker routes, at 750, the PDU over the associated non-operator network. Otherwise, the broker discards, at 760, the PDU.

The broker 250 and sub-components contained therein (e.g., the PDU analyzer 305, the TS matching mechanism 310, the interface routing determiner 315, the VPN setup mechanism 335, the VPN selector interface 340, the connection establishment mechanism 320, the network status determiner 325, the operator network interface 345, and the non-operator network interface 350) may be realized based on hardware implementations. In some embodiments, they may be realized by software or firmware programmed to achieve the functionality of routing traffic across different network interfaces, as disclosed herein. They may also be realized based on a combination of hardware and software or firmware.

Figure 8:
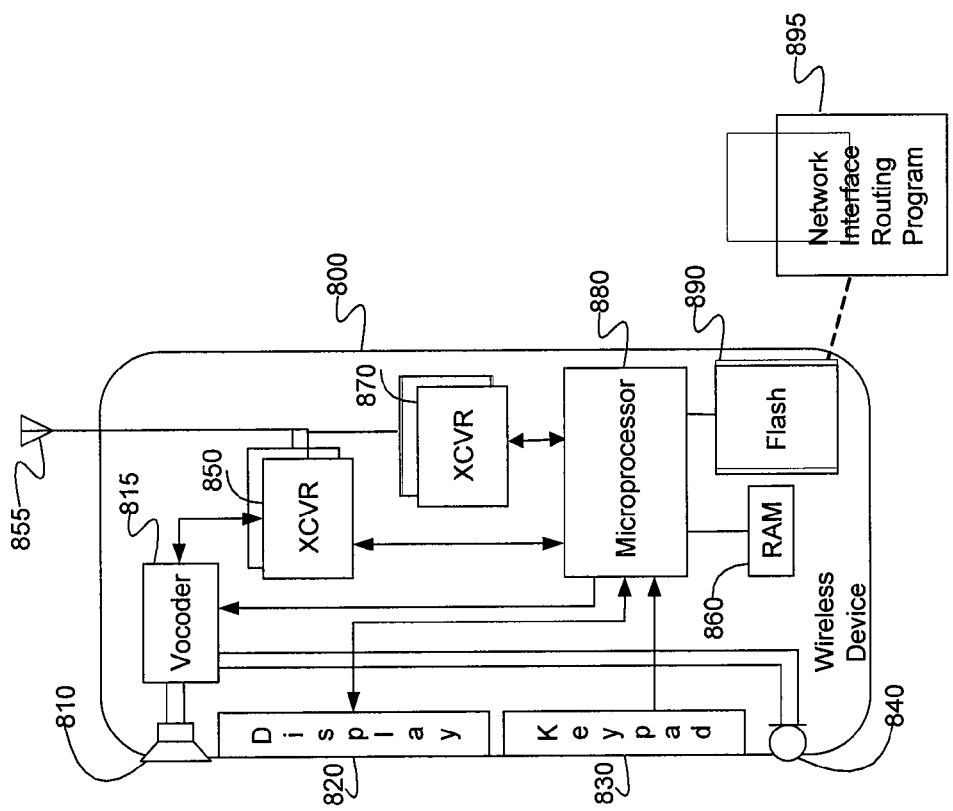
FIG. 8 is a high level functional block diagram of a wireless device, which may be configured to perform traffic routing across multiple network interfaces via a VPN traffic selector and local policies.

FIG. 8 is a high level functional block diagram of a wireless device 800, which may be the wireless device 105 or 155 of a customer of a network operator. Although the wireless mobile device 500 may be a smart-phone or may be incorporated into another device, such as a portable personal computer, personal digital assistant (PDA) or the like, for discussion purposes, the illustration in FIG. 5 shows the wireless mobile device 800 in the form of a handheld device. The handheld device embodiment of the wireless mobile device 800 may function as a normal digital wireless telephone station. For that function, the mobile device 800 includes a microphone 840 for audio signal input and a speaker 810 for audio signal output. The microphone 840 and speaker 810 connect to voice coding and decoding circuitry (vocoder) 815. For a voice telephone call, for example, the vocoder 815 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile device 800 also includes at least one digital transceiver (XCVR) 850. The mobile device 800 is a multimode device capable of operations on various technology type networks, such as the networks 120 and 135. For example, the handheld device 800 may utilize one or more of 3GPP2 (1XRTT and EVDO) technologies, 3GPP (LTE/GSM/UMTS) technologies, or IEEE 802.11 (WiFi, WiMax, etc.) technologies. For that purpose, the transceiver (XCVR) 850 could be a multimode transceiver, or the mobile device 800 may include two or more transceivers, e.g., transceivers 850 and 870, each of which supports a subset of the various technologies or modes. The concepts discussed herein encompass embodiments of the mobile device 800 utilizing any digital transceivers that conform to current or future developed digital wireless communication standards.

The transceiver 850 or 870 provides two-way wireless communication of information, such as vocoded speech samples and/or digital message information, in a selected one of the technology modes. The transceiver 850 or 870 also sends and receives a variety of signaling messages in support of the various voice and data services provided via the mobile device 800 and the communication network (described earlier with regard to FIG. 1). Each transceiver 850 or 870 connects through RF send and receive amplifiers (not separately shown) to a set of antennae 855. In the example, the transceiver 850 or 870 is configured for RF communication in accord with a digital wireless protocol, such as the current 3GPP2 and 3GPP protocols. Transceiver 850 or 870 is capable of detecting different network types in any given service area via, e.g., antenna 855. In some embodiments, a mobile device implements the algorithms for traffic routing across different network interfaces, as described herein, locally on the device. In this case, the capabilities of routing traffic across different network interfaces may be turned on whenever the mobile device is activated and does not need to download programs that perform the algorithms for routing traffic across multiple network interfaces from outside of the mobile device. In some embodiments, a mobile device may be designed to dynamically download programs for traffic routing capabilities from a centralized location, e.g., a server, via the network. In this situation, the network communications may also support downloading of programs designed to perform the algorithm for traffic routing as described herein and data and/or updates thereof from a server such as 150.

The mobile device 800 includes a display 820 for displaying messages, menus of different applications or the like, call related information requested by the user, e.g., calling party numbers, etc. A keypad 830 enables dialing digits for voice and/or data calls as well as generating selection inputs, for example, as may be keyed-in by the user based on a displayed menu or as a cursor control and selection of a highlighted item on a displayed screen. The display 820 and keypad 830 are the physical elements providing a textual or graphical user interface. In addition to normal telephone and data communication related input/output, these elements also may be used for display of menus and other information to the user and user input of selections, if needed during a system selection operation or during a selection software download operation. Various combinations of the keypad 830, display 820, microphone 840 and speaker 810 may be used as the physical input and output elements of the GUI, for multimedia (e.g. audio and/or video) communications. Of course other user interface elements may also be used, such as a stylus and touch sensitive display screen, as in a PDA or a smart phone.

A microprocessor 880 serves as a programmable controller for the wireless mobile device 800, in that it controls all operations of the wireless mobile device 800 in accordance with programming that it executes, for all normal operations, and for operations involved in selecting a preferred technology and selecting an available network of the appropriate technology type, for mobile communications. In the example, the wireless mobile device 800 includes flash type program memory 890, for storage of various "software" or "firmware" program routines and mobile configuration settings, such as a mobile directory number (MDN) and/or mobile identification number (MIN), etc. The wireless mobile device 800 may also include a non-volatile random access memory (RAM) 860 for a working data processing memory. Of course, other storage devices or configurations may be added to or substituted for those in the example. In a present implementation, the flash type program memory 890 may store firmware such as a boot routine, device driver software, an operating system, call processing software, and vocoder control software, and any of a wide variety of other applications, such as client browser software and short message service software. The memories 890 and 860 also store various data, such as telephone numbers and server addresses, downloaded data such as multimedia content, and various data input by the user. Programming 895, implemented to perform the algorithm for traffic routing across different network interfaces via VPN and local policies, as disclosed herein, may be stored in the flash type program memory 890, sometimes referred to as "firmware," and may be loaded into and executed by the microprocessor 880.

Hence, aspects of the methods for routing traffic across multiple network interfaces via VPN and local policies as discussed herein may be embodied in programming. The executable programs from such programming may be stored in the storage of the mobile device, such as RAM 860 or as a flash memory module 895 in the flash memory 890. The data stored with or separate from such programs for traffic routing across multiple network interfaces via VPN and local policies may include various lists related to the parameters or conditions configured for traffic routing activities, in accordance with the algorithm disclosed herein to route data traffic to appropriate network interfaces based on VPN and local policies.

Program aspects of the technology may be thought of as "products" or "articles of manufacture" typically in the form of executable code and/or associated data that is carried on or embodied in a type of machine readable medium. "Storage" type media include any or all of the non-transitory, tangible memory of the computers, processors, mobile stations or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of software from a computer or processor into the mobile station to add or update the functionality to that device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, "storage" media relates to tangible, non-transitory media for storing programming and/or data, and unless restricted to such "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as the main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the broker implementation described above can be embodied in a hardware device, it can also be implemented as a software only solution—e.g., requiring installation on an existing server. In addition, it can also be implemented as a firmware, firmware/software combination, firmware/hardware combination, or hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method of routing data traffic of a mobile device, serviced by an operator, across multiple network interfaces, comprising the steps of:
   obtaining a packet data unit (PDU), generated in association with an application that can be selectively activated on the mobile device and carrying a destination Internet protocol (IP) address representing a server supporting the application;
   identifying, by a broker associated with the mobile device, the destination IP address from the obtained PDU;
   retrieving information relating to one or more traffic selectors after identifying the destination IP address from the obtained PDU;
   determining whether the obtained PDU is associated with an operator application or a non-operator application based on the destination IP address and the information relating to the one or more traffic selectors;
   routing, by the broker, the PDU to one of the multiple network interfaces based on the determination of whether the obtained PDU is associated with an operator application or a non-operator application,
   wherein, a PDU associated with an operator application is routed via a virtual private network (VPN) when the mobile device can-not be connected to an operator network of the mobile device.

2. The method of claim 1, wherein the traffic selectors are represented as ranges of IP addresses corresponding to applications supported by the operator.

3. The method of claim 2, wherein the ranges of IP addresses are dynamically updated on the mobile device and stored in the mobile device during exchange of traffic selectors at VPN setup.

4. The method of claim 2, wherein the step of determining comprises the steps of:
   comparing the destination IP address with the ranges of IP addresses;
   deciding that the PDU relates to an operator application if the destination IP address is within one of the ranges of IP addresses; and
   deciding that the PDU relates to a non-operator application if the destination IP address is not within any of the ranges of IP addresses.

5. The method of claim 1, wherein the step of routing the PDU comprises the steps of:
   routing the PDU associated with an operator application to an operator application server residing within the operator network; and
   routing a PDU associated with a non-operator application traffic based on a determination whether the destination IP address is public or private.

6. The method of claim 1, wherein the step of routing the PDU associated with an operator application comprises the steps of:
   checking whether the mobile device is currently connected to the operator network;
   routing the PDU to the operator network if the mobile device is currently connected to the operator network; and
   identifying an alternative viable means to route the PDU based on one or more policies if the mobile device is currently not connected to the operator network.

7. The method of claim 6, wherein the step of identifying an alternative viable means to route the PDU comprises the steps of:
- checking whether the mobile device is currently associated with a non-operator network;
- if the mobile device is currently not associated with a non-operator network and an non-operator network is available, establishing an association between the mobile device and the available non-operator network, whether or not the operator network is available;
- if an association between the mobile device and a non-operator network either exists or can be successfully established, routing the PDU through the non-operator network via the VPN;
- if an association between the mobile device and a non-operator network does not exists and can-not be successfully established but the operator network is currently available, establishing a connection between the mobile device and the operator network;
- if an association between the mobile device and a non-operator network does not exist and can-not be established and a connection between the mobile device and the operator network is successfully established, routing the PDU via the operator network; and
- if neither a connection between the mobile device and the operator network nor an association between the mobile device and an non-operator network exists and can be established, discarding the PDU.

8. The method of claim 6, wherein the step of identifying a viable means to route the PDU based on policies comprises the steps of:
- checking whether the operator network is available to make a connection with the mobile device;
- if the operator network is available, establishing a connection between the mobile device and the operator network;
- routing the PDU to the operator application server via the operator network if the mobile device is successfully connected to the operator network, whether or not an association between the mobile device and a non-operator network exists;
- if the connection between the mobile device and the operator network does not exists and can not be established, the mobile device is currently not associated with a non-operator network but a non-operator network is available, establishing an association between the mobile device and the non-operator network;
- if a connection between the mobile device and the operator network does not exists and can-not be established and the association between the mobile device and a non-operator network exists or can be successfully established, routing the PDU through the non-operator network via the VPN; and
- if neither an association between the mobile device and a non-operator network nor a connection between the mobile device and the operator network exists and can be established, discarding the PDU.

9. The method of claim 7, wherein the step of routing the PDU via the VPN traffic selector comprises the steps of:
- checking whether the mobile device is currently associated with the VPN;
- establishing an association between the mobile device and the VPN if the mobile device is currently not associated with the VPN; and
- routing the PDU to an operator application server hosting the application via the VPN.

10. The method of claim 8, wherein the step of routing the PDU via the VPN comprises the steps of:
- checking whether the mobile device is currently associated with the VPN;
- establishing an association between the mobile device and the VPN if the mobile device is currently not associated with the VPN; and
- routing the PDU to an operator application server hosting the application via the VPN traffic selector.

11. The method of claim 5, wherein the step of routing the PDU of a non-operator application traffic comprises the steps of:
- determining whether the destination IP address is a public or private IP address;
- routing the PDU via either a non-operator network or the operator network if the destination IP address is a public IP address; and
- routing the PDU via a non-operator network if the destination IP address is a private IP address.

12. The method of claim 11, wherein the step of routing the PDU that has a public IP address comprises the steps of:
- checking whether the mobile device is currently associated with a non-operator network;
- if the mobile device is currently not associated with a non-operator network and a non-operator network is available, establishing an association between the mobile device and a non-operator network;
- if an association between the mobile device and a non-operator network either exists or can be successfully established, routing the PDU via the non-operator network, whether or not a connection between the mobile device and the operator network exists;
- if the association between the mobile device and a non-operator network does not exist and can-not be successful established and the operator network is available, establishing a connection between the mobile device and the operator network;
- if no association between the mobile device and a non-operator network exists and can be made and a connection between the mobile device and the operator network either exists or can be successfully established, routing the PDU via the operator network; and
- if neither an association between the mobile device and a non-operator network nor a connection between the mobile device and the operator network exists and can be established, discarding the PDU.

13. The method of claim 11, wherein the step of routing the PDU that has a public IP address comprises the steps of:
- checking whether the mobile device is currently connected to the operator network;
- if the operator network is currently not connected to the mobile device but is available, establishing a connection between the mobile device and the operator network;
- if the mobile device is either already connected to the operator network or a connection between the mobile device and the operator network is successfully made, routing the PDU via the operator network, whether or not an association exists between the mobile device and a non-operator network;
- if the mobile device is not and can-not be successfully connected to the operator network and is currently not associated with a non-operator network but a non-operator network is available, establishing an association between the mobile device and the available non-operator network;
- if no connection between the mobile device and the operator network exists and can be established and an association between the mobile device and a non-operator network either exists or can be successfully established, routing the PDU via the non-operator network to the application; and if neither a connection between the mobile device and the operator network nor an association between the mobile device and a non-operator network exists and can be established, discarding the PDU.

14. The method of claim 11, wherein the step of routing the PDU that has a private IP address comprises the steps of:

checking whether the mobile device is currently associated with a non-operator network;

establishing an association between the mobile device and a non-operator network if the mobile device is currently not associated with a non-operator network and a non-operator network is available;

if an association between the mobile device and a non-operator network either exists or can be successfully established, routing the PDU via the associated non-operator network to the application; and if an association between the mobile device and a non-operator network does not exist and can-not be established, discarding the PDU, whether or not the mobile device is connected to the operator network.

15. An apparatus comprising:

a storage configured for storing information related to one or more traffic selectors based on which a routing decision is made; and a broker configured for receiving a packet data unit (PDU), generated in association with an application that can be selectively activated on a mobile device, serviced by an operator, and having a destination Internet protocol (IP) address representing a server supporting the application, and routing the PDU across multiple network interfaces, wherein the broker routes the PDU to one of the multiple network interfaces based on whether the PDU is associated with an operator application or a non-operator application, and a PDU associated with an operator application is routed via a virtual private network (VPN) when the mobile device can-not be connected to an operator network of the mobile device.

16. The apparatus of claim 15, wherein the broker comprises:

a PDU analyzer configured for analyzing the received PDU and identifying the destination IP address from the PDU;

a traffic selector (TS) matching mechanism configured for retrieving the information related to the one or more traffic selectors, represented as ranges of IP addresses corresponding to applications supported by the operator, and determining whether the destination IP address is within any of the ranges of IP addresses;

an interface routing determiner configured for reaching a determination as to whether the PDU is associated with an operator application or a non-operator application based on the result of the matching and routing the PDU to an appropriate network interface based on the determination and the connectivity status of multiple networks.

17. The apparatus of claim 16, wherein the broker further comprises:

a network status determiner configured to check the connectivity status of any of the multiple networks;

a connection establishment mechanism configured to make a connection/association with any of the multiple networks;

a VPN setup mechanism configured for setting up a VPN when the PDU is to be routed to an operator application server located in the operator network via a non-operator network; and a plurality of interfaces each of which is configured for routing the PDU to a corresponding network interface.

18. The apparatus of claim 16, wherein the interface routing determiner, in reaching the determination, is configured to:

compare the destination IP address with one or more IP addresses within the ranges of IP addresses;

decide that the PDU relates to an operator application if the destination IP address is within one of the ranges of IP addresses; and decide that the PDU relates to a non operator application if the destination IP address is not within any of the ranges of IP addresses.

19. The apparatus of claim 16, wherein the interface routing determiner in routine the PDU to the appropriate network interface is configured to:

route the PDU associated with an operator application to an operator application server residing within the operator network; and route the PDU associated with an non-operator application based on a determination whether the destination IP address is public or private.

20. The apparatus of claim 19, wherein when the PDU is associated with an non-operator application, if the PDU has a private IP address, the broker routes the PDU via a non-operator network; and if the PDU has a public IP address, the broker routes the PDU via either a non-operator or an operator network, depending on whether the mobile device can be connected or associated with an available network and preferences set in local policies.

21. The apparatus of claim 19, wherein the broker routes the PDU associated with an operator application by:

checking whether the mobile device is currently connected to the operator network;

routing the PDU to the operator network if the mobile device is currently connected to the operator network; and identifying an alternative viable means to route the PDU.

22. The apparatus of claim 21, wherein the broker in routing the PDU associated with the operator application is further configured to:

check whether the mobile device is currently associated with a non-operator network;

if the mobile device is currently not associated with a non-operator network but an non-operator network is available, establish an association between the mobile device and the available non-operator network;

if an association between the mobile device and a non-operator network either exists or can be successfully established, routes the PDU through the non-operator network via the VPN, whether or not the operator network is available; and if the association between the mobile device and a non-operator network does not exist and can be established and the operator network is available, establish a connection between the mobile device and the operator network;

if no association between the mobile device and a non-operator network exists and can be established and the mobile device can be successfully connected to the operator network, route the PDU to the operator application server via the operator network; and if neither an association between the mobile device and a non-operator network nor a connection between the mobile device and the operator network exists and can be established, discard the PDU.

23. The apparatus of claim 21, wherein the broker in routing the PDU associated with the operator application is further configured to:
check whether the operator network is currently available;
if the operator network is available, establish a connection between the mobile device and the operator network;
if the mobile device is already connected to the operator network or the connection can be successfully made, routes the PDU through to the operator network, whether or not an association between the mobile device and a non-operator exists;
if no connection between the mobile device and the operator network exists and can be established and a non-operator network is available, establish an association between the mobile device and the available non-operator network;
if no connection between the mobile device and the operator network exists and can be established and an association between the mobile device and the available non-operator network exists or can be established, route the PDU through the non-operator network via the VPN; and
if neither the association between the mobile device and a non-operator network nor a connection between the mobile device and the operator network exists and can be established, discard the PDU.

24. A non-transitory machine readable medium having data stored thereon, the data, once read by a machine, cause the machine to perform the steps of:
obtaining a packet data unit (PDU), generated in association with an application that can be selectively activated on the mobile device and carrying a destination Internet protocol (IP) address representing a server supporting the application;
identifying, by a broker associated with the mobile device, the destination IP address from the PDU;
retrieving information relating to one or more traffic selectors;
determining whether the PDU is associated with an operator application or a non-operator application based on the destination IP address and the information relating to the one or more traffic selectors;
routing, by the broker, the PDU to one of the multiple network interfaces based on the determination of whether the PDU is associated with an operator application or a non-operator application,
wherein, a PDU associated with an operator application is routed via a virtual private network (VPN) when the mobile device can-not be connected to an operator network of the mobile device.

* * * * *